Patented Jan. 13, 1953

2,625,525

UNITED STATES PATENT OFFICE

2,625,525

TERPOLYMERS OF SULFUR DIOXIDE, MONOOLEFINIC MATERIALS AND A LIQUID POLYMER OF A CONJUGATED DIENE, AND THEIR PRODUCTION

Charles S. Lynch, Bartlesville, Okla., assignor to Phillips Petroleum Company, a corporation of Delaware No Drawing. Application November 17, 1949, Serial No. 127,995

12 Claims. (Cl. 260—29.7)

This invention relates to the production of synthetic resinous materials formed by the inter-reaction of sulfur dioxide, an unsaturated organic material and a liquid polydiene, preferably one which is free from solid polymers and having a molecular weight within the limits of 500 to 4000. In another embodiment this invention relates to heteropolymeric materials as new compositions.

Sulfur dioxide resins, which are heteropolymers of sulfur dioxide and unsaturated organic materials, and various methods for their production are well known. These materials are inherently inexpensive and have utility in numerous applications. However, utility of many of these resins is limited, due in a large part to their tendency to decompose at elevated temperatures, such as from 300 to 500° F., and to their low resistance to solvent action of certain well known solvents.

This invention is concerned with the manufacture of modified sulfur dioxide resins having improved properties, particularly with respect to resistance to solvent action of various solvents, and higher stability toward decomposition at elevated temperatures.

An object of this invention is to provide new and novel heteropolymeric materials.

Another object is to provide for the production of new and novel heteropolymeric materials.

Another object is to provide for the production of new and novel terpolymers in latex form.

Another object is to provide modified olefin-sulfur dioxide resins having improved properties over those of the corresponding unmodified olefin-sulfur dioxide resin, particularly as regards resistance to decomposition at elevated temperatures, and to solvent action of certain organic solvents.

Other objects will be apparent to those skilled in the art from the accompanying discussion and disclosure.

In accordance with one embodiment of this invention, sulfur dioxide is inter-reacted with one, or more unsaturated organic compounds, and a liquid polymer of 1,3-butadiene, preferably one which is free from solid polymers and having a molecular weight within the range of 500 to 4000, to produce new and novel resinous terpolymers, or heteropolymeric resinous materials. The reaction charge contains from 0.3 to 15 per cent by weight of liquid polymer and a molecular excess of sulfur dioxide, each based on the amount of other unsaturated organic reactants present.

The terpolymers of my invention are heteropolymeric resinous materials and can be termed modified sulfur dioxide resins. These modified resins resemble the corresponding unmodified sulfur dioxide resins in appearance, but the presence of the reacted liquid polybutadiene in chemical combination with the other unsaturated compound and sulfur dioxide produces a modified resin of improved characteristics.

The heteropolymeric resinous materials of my invention, although somewhat similar in appearance to the corresponding unmodified resin, differ markedly therefrom. For example, 1-butene-sulfur dioxide resin is readily dissolved by such solvents as acetone and cyclohexanone while the corresponding terpolymer, i. e. 1-butene-sulfur dioxide-polydiene resin, resists the solvent action of these materials. The 1-butene-sulfur dioxide resin molds at temperatures at about 200 to 210° F., while somewhat higher temperatures are required for molding the terpolymer, which will mold to a clear transparent article. Heating 1-butene-sulfur dioxide resin for only 15 minutes at 400° F. causes a loss in weight of the resin of more than 10 per cent by decomposition into the original monomers, whereas the corresponding terpolymer compositions of my invention are unaffected under the same conditions of test. These terpolymers, although insoluble in acetone and cyclohexanone can nevertheless be plasticized. The new compositions of my invention are important since they greatly extend the utility of the corresponding olefin-sulfur dioxide resin. In their modified form they can be used in contact with a wider variety of solvents, they can be developed for use in conventional molding techniques, and can be placed in service at higher temperature levels, than when in their original or unmodified form.

It is a fundamental feature of my invention that the liquid polydiene reactant is not a rubber-like synthetic polymer, in any sense of the word, but rather it is a non-rubber-like resinous polymer free from solid polymers and it has a molecular weight within the limits of 500 to 4000, and a viscosity below 10,000 Saybolt furol seconds measured at 100° F. These non-rubber-like polymers may be polymers of a conjugated diene alone, or copolymers of a diene with a minor proportion of a monoolefin copolymerizable therewith and containing the group, $CH_2=C<$, such as styrene, methyl substituted styrenes, and the like. Suitable conjugated dienes from which these liquid polymer reactants can be made include primarily those having four to six carbon atoms per molecule, such as 1,3-butadiene, chloroprene, bromoprene, isoprene, dimethylbutadiene, and the like.

The liquid non-rubber-like polymers employed in the process of my invention, may be produced by any suitable means. In one such preparation method, the polymer reactant can be prepared by solution polymerization in the presence of a finely divided alkali metal catalyst and a hydrocarbon solvent. In another method, the liquid polymer can be prepared by aqueous emulsion polymerization in the presence of relatively large amounts of mercaptan modifiers. In still another method, the liquid polymer can be produced in the presence of hydrofluoric acid as a catalyst.

When employing emulsion polymerization, the polymer reactant is prepared in the presence of a sufficiently large amount of modifier, such as 3 to 10 parts by weight of an alkyl mercaptan, per 100 parts of monomers, that the polymer is as discussed herein.

One method of preparing the polymer reactant by solution polymerization is disclosed in application, Serial No. 67,098, W. W. Crouch, filed December 23, 1948. In accordance with the procedure referred to in that copending application, the preparation in a preferred modification comprises the steps, (1) removal of 1,2-butadiene and other deleterious materials from the 1,3-butadiene feed stock; (2) polymerization of the 1,3-butadiene obtained from the first step in the presence of an alkali metal catalyst and a suitable diluent, the reaction being carried out under carefully controlled reaction conditions, particularly temperature, catalyst condition and concentration, quantity of solvent, and rate of butadiene addition; (3) recovery of the product by some appropriate means such as by treatment with a small quantity of water followed by introduction of carbon dioxide to react with the alkali metal and organo-alkali metal compounds and precipitate alkali metal carbonates, removal of the precipitate, and stripping to separate the diluent from the liquid polymer. When conducting the polymerization in this manner, a polymer of low molecular weight is produced, and the formation of high molecular weight compounds is excluded. The polybutadiene thus produced is a substantially colorless, transparent liquid which is free from dissolved or suspended solid polymeric material. The viscosity of the polybutadiene product as measured at 100° F. is below 10,000 Saybolt furol seconds.

In the first step, a diene feed stock is preferably prepared in a purity of 98 per cent with a maximum of 2 per cent of non-paraffinic impurities. Impurities, such as 1,2-butadiene, olefins, acetylenes and oxygenated compounds, can be removed by fractionation, and the purified feed stock dried.

The second step comprises polymerization of the diene obtained from the first step, in the presence of a finely divided alkali metal catalyst and a suitable diluent such as benzene, heptane, and the like, the reaction being carried out under carefully controlled reaction conditions. Care is taken to exclude oxygen from the reaction mixture.

Generally, when carrying out the second step of the polymer preparation procedure, a solvent such as benzene is charged to a reactor, equipped with stirrer or other means for providing agitation, along with the finely divided alkali metal catalyst, generally sodium or potassium, suspended in a suitable dispersing medium such as benzene, heptane and the like. The mixture is heated to the desired temperature, i. e. from 60 to 110° C. after which a portion of the conjugated diene, such as 1,3-butadiene, is introduced, for example, in an amount such that the concentration of 1,3-butadiene in the solvent is in the range of from 0.03 to 0.15 pounds per pound of solvent. The reaction mixture is held at a constant temperature and stirred until the reaction is initiated, as evidenced by an increase in temperature and a drop in pressure. Time usually required for the initiation period is in the range of 5 to 30 minutes. After the reaction has started, additional 1,3-butadiene is charged at a rate ranging from 0.03 to 0.4 pound of the diolefin per hour per pound of solvent. Addition of butadiene is continued until the concentration of polymer in the reaction mixture reaches the desired level. After flow of diolefin is stopped, agitation of the reaction mixture is continued until the reaction is substantially complete as evidenced by a drop in pressure in the reactor to the vapor pressure of the solvent-polymer solution at the operating temperature.

The preparation of the alkali metal catalyst involves charging a dispersion medium such as xylene to a reaction vessel wherein it is heated to a temperature above the melting point of the alkali metal, as 100 to 115° C. in the case of sodium, in a dry oxygen-free atmosphere, after which the freshly cut alkali metal is added. The temperature is adjusted to about 110° C. and the mixture vigorously agitated, for a period usually ranging from 5 to 15 minutes or until a stable dispersion is produced. The system is allowed to cool to about 100° C. when agitation is stopped. The catalyst dispersion usually contains about 5 to 35 weight per cent metals based on the dispersion medium employed. Catalyst thus prepared is ready for use in the polymer preparative method above discussed.

To obtain a polymer of low viscosity, it is essential that the catalyst be finely dispersed. It is essential that the average particle size of the catalyst be below 200 microns and desirable that it be below 100 microns. As the particle size of the catalyst is increased, polymers of higher viscosity are obtained.

In general, the time required to carry out the polymerization step is exclusive of the initial induction period, does not exceed eight hours, and it is preferably below four hours. The polymerization is effected as rapidly as possible since extended reaction times result in polymers of undesirably high viscosity.

The average molecular weight of the polydiene of the preparative method discussed herein, will generally vary from 500 to 4000. It has a viscosity below 10,000 Saybolt furol seconds as measured at 100° F. The liquid product is comprised in its entirety of low molecular weight material, i. e. it is free from dissolved or suspended solid polymers.

The double bonds in the polymer thus prepared are of such a nature that they do not react completely under conditions ordinarily used for iodine number determinations and therefore this method for determining unsaturation is not reliable. However, the unsaturation has been determined by an iodine monochloride method which gives more significant results. For example, if a molecular weight of 2000 is assumed, the unsaturation has been found to be in the neighborhood of about 30 double bonds per molecule. This is equivalent to an iodine number of about 371. Stated in a different way, the product on this basis is calculated to contain 0.79 double bond per butadiene unit.

While the preparative method above discussed has been described in terms of the production of liquid polydiene, it is also applicable to other polymerizations in which a diene is the essential ingredient. For example, it is applicable to the polymerization of a diene with materials copolymerizable therewith, and such materials include vinyl compounds such as styrene, methyl substituted styrenes, etc. In all such polymerizations the major polymerizable ingredient is a diene, and this component is present in an amount which exceeds 50 weight per cent of the monomeric material.

Polybutadienes of the type discussed herein can also be prepared by mass polymerization of 1,3-butadiene, in the presence of anhydrous hydrofluoric acid as a catalyst, conducted in an inert solvent, at a temperature within the limits of about −110° F. to 20° F. This method is discussed in detail in copending application, Serial No. 53,995, filed October 11, 1948. When desired, a copolymer of the type already discussed, such as butadiene-styrene, can be formed in the presence of HF in the same manner.

In one embodiment of my invention the inter-reaction of sulfur dioxide, polymer, and an olefinic organic compound can be conducted as a bulk polymerization, i. e. no inert solvent of any kind being required. Solution polymerization may be employed, dependent on the solubility of the reaction mixture in the specific solvent selected. In a preferred embodiment the inter-reaction can be carried out in aqueous emulsion.

When effecting the inter-reaction in aqueous emulsion, the process of the present invention comprises the preparation of an aqueous emulsion of an unsaturated organic compound, sulfur dioxide, and liquid polymer reactants, in the presence of a suitable emulsifying agent and a catalyst, such as lithium nitrate. The emulsified reactants are agitated at a reaction temperature for a period necessary to effect the desired conversion, after which the resulting latex may be subjected to a stripping operation to remove unreacted reactants together with any volatile impurities. Separation of the resin is effected by coagulation of the latex such as with brine-alcohol, brine-acid, solutions of electrolytes, etc. followed by water washing, filtration and drying of the heteropolymeric resinous product.

The practice of my preferred embodiment provides for the formation of stable latices as intermediate products. These latices are produced in the form of emulsions and are extremely valuable for use in various impregnating and coating operations such as treatment of paper, cloth, and the like, and they may be mixed with other latices, such as synthetic rubber latex, to provide a variety of materials.

The unsaturated organic reactants employed in the preparation of the heteropolymeric resinous materials of my invention are any which will react with sulfur dioxide to produce heteropolymeric resinous products. Preferably these reactants are monoolefinic organic compounds, and include olefins such as propylene, 1-butene, 2-butene, isobutylene, pentenes, hexenes, octenes, and the like; aryl olefins as styrene, alpha-methyl styrene, and alpha-chloro styrene; and vinyl compounds such as vinyl chloride and vinyl bromide. In general, the olefinic compound employed will not contain more than 20 carbon atoms per molecule. It is frequently desired to employ a mixture of olefinic compounds rather than a single olefinic compound, in carrying out the process of this invention.

When operating in accordance with the preferred embodiment, i. e. conducting the polymerization in aqueous emulsion, it is found that sulfur dioxide inter-reacts with the monoolefin and polymer reactants in a mole ratio, based on the monoolefin, exceeding 1:1, and accordingly it is important to maintain a molar excess of sulfur dioxide to monoolefin reactant in the reaction mixture. Although such ratios do not exceed 1.8:1, it is sometimes desirable to maintain a ratio of sulfur dioxide to olefinic material in the reaction mixture of about 2:1. In some cases it may even be desirable to use a higher ratio of sulfur dioxide to monoolefin, for example, a ratio of 5:1 or greater, depending upon operating conditions, olefinic material employed, amount of aqueous medium, etc. Frequently, it will be desirable to remove the reactants from the reaction zone, and separate unreacted materials, when between about 50 to about 97 per cent of the monoolefinic reactant material has reacted.

Emulsifying agents which are applicable are those which are active in an aqueous medium which has a pH of about 1 to 2, and sometimes has a pH as low as about 0.5. The emulsifying agent used should, of course, be effective at the pH of the aqueous medium in the reaction mixture. Among the compounds which have been found effective are the long-chain alkyl sodium sulfates and the branched-chain aliphatic or aromatic sodium sulfates, salts of organic bases such as amine salts and quaternary ammonium salts. Examples of these materials are lauryl sodium sulfate, diamyl sodium sulfosuccinate, sodium di-secondary-butyl-naphthalene sulfonate, dodecylamine hydrochloride, dodecylamine sulfate, sodium alkaryl sulfonates, and the like, the latter containing from 11 to 15 carbon atoms in the alkyl group attached to a single aryl ring. The amount of emulsifying agent employed is that quantity which is necessary to produce a stable emulsion of the ingredients. In some cases an amount as low as about 0.5 part per 100 parts of total reactants is considered sufficient, and usually an amount not to exceed about 10 parts is added.

The reaction appears to take place only in the liquid phase, and it will proceed in the absence of catalysts only in the presence of actinic light, or it will proceed in the presence of any one of a large number of catalysts such as those named here below, in the dark or in the light.

Catalysts applicable in carrying out the inter-reaction of my invention are the same as those which have been found effective when carrying out the reaction between olefinic compounds and sulfur dioxide to produce synthetic resins by methods heretofore employed. Examples of these catalytic materials include nitrates of alkali metals and ammonium, ferric polyphosphates such as ferric pyrophosphate, ferric tetraphosphate, ferric tripolyphosphate, and ferric hexametaphosphate, potassium persulfate, hydrogen peroxide, organic peroxides, peracetic acid, and the like. The amount of catalyst used may vary over a wide range and will depend upon the material chosen. In cases where alkali metal nitrates or ammonium nitrates are employed, the amount may vary from 0.03 to 0.60 part by weight per 100 parts by weight of total reactants, with an amount ranging from 0.15 to 0.45 part being generally preferred. When using other catalysts, the amount of catalyst used may be somewhat higher but in any event it is determined by the case at hand.

Temperatures for carrying out the modified resin-producing reactions of this invention will usually fall within the range of about 10 to about 140° F. with the narrower range 50 to 120° F. being most frequently preferred. However, in some instances it may be considered advisable to employ temperatures below 10° F. in order to get a more satisfactory reaction.

The amount of sulfur dioxide that inter-reacts with the monoolefin and polymer reactants, is conveniently expressed in terms of the ratio of mols sulfur dioxide reacted, per mol reacted monoolefin, the value of the ratio being dependent on the specific olefin and specific reaction conditions employed. However, the mol ratio of reacted sulfur dioxide to reacted monoolefinic hydrocarbon is always greater than 1:1 and always less than 1.8:1, the limits more generally being about 1.001:1 to 1.72:1. For example when inter-reacting butene with sulfur dioxide and a liquid polybutadiene, the mol ratio of chemically combined sulfur dioxide to chemically combined butene in the terpolymer is less than 1.16:1 but is at least 1.002:1. When inter-reacting octene with sulfur dioxide and a liquid polybutadiene, the mol ratio of chemically combined sulfur dioxide to chemically combined octene in the terpolymer is less than 1.315:1 but is at least 1.004:1. Similarly, when inter-reacting sulfur dioxide with a non-cyclic aliphatic monoolefin reactant containing 20 carbon atoms in the molecule, the mol ratio of chemically combined sulfur dioxide to chemically combined aliphatic monoolefin reactant in the terpolymer is less than 1.72:1 but is at least 1.01:1.

Obviously, when polymerizations are carried out in aqueous emulsion in the absence of freezing point depressants, temperatures below the freezing point of the acidic aqueous medium cannot be employed. The use of various additive agents, however, makes a process of the type disclosed herein applicable at lower temperatures. An example of such a low temperature system is a glycerine-water solution, and the term "aqueous emulsion" should be construed to include use of an aqueous medium comprising water and a sufficient amount of a water soluble component to lower the freezing point below the desired polymerization temperature, whether or not the actual polymerization temperature is above or below freezing.

It is generally preferred that the emulsion be of an "oil-water" type, with the ratio of aqueous-medium to monoolefinic reactant material between about 1.5:1 and about 10:1, in parts by weight. At low ratios the emulsions tend to have high viscosities and at high ratios the yield per unit volume of reactor, per unit of time, is low.

In the practice of this preferred embodiment of my invention, suitable means will be necessary to establish and maintain an emulsion to remove reaction heat to maintain a desired reaction temperature. The emulsion polymerization may be conducted in batches, semicontinuously or continuously. The total pressure on the reactants is preferably at least as great as the total vapor pressure of the mixture so that the initial reactants will be present in liquid phase.

As has been briefly stated above, the heteropolymeric resinous compositions of my invention can also be prepared by bulk polymerization methods, and in specific instances, by solution polymerization, dependent on the solubility of the reaction mixture in the solvent selected.

In the embodiment employing bulk polymerization no inert solvent is necessary. However, in this embodiment, when employing a mol ratio of sulfur dioxide to a monoolefin, as butene-1 for example, above 1:1, and particularly as high as from 5:1 to 20:1, the sulphur dioxide reactant itself acts as a solvent, thus simulating solution polymerization conditions. The conditions above discussed as regards catalyst, temperature, reaction time, choice of reactants, and ratio of sulfur dioxide to reactants, etc., in connection with the emulsion polymerization, are employed when carrying out the reaction under bulk polymerization conditions.

Similarly, when conducting the reaction under solution polymerization conditions the choice of reaction conditions, reactants, and the like are exactly the same as when employing bulk polymerization, except that a selected inert solvent is employed for the purpose of achieving more uniform reaction conditions, particularly as regards temperature and uniform intermingling of reactants.

In the practice of any of the embodiments herein, it is believed essential that all initial reactants be maintained in the liquid phase.

The advantages of this invention are illustrated by the following examples. The reactants and their proportions and the other specific ingredients of the recipes are presented as being typical and should not be construed to limit the invention unduly.

*Example I*

Liquid polybutadiene latex was made by emulsion polymerization according to the following recipe:

| | Parts by weight |
|---|---|
| 1,3-butadiene | 100 |
| Water | 180 |
| Sodium alkyl benzene sulfonate | 5.0 |
| Potassium chloride | 0.5 |
| Cumene hydroperoxide | 0.10 |
| Potassium pyrophosphate | 0.177 |
| Ferrous sulfate heptahydrate | 0.14 |
| Potassium hydroxide | 0.10 |
| Dextrose | 1.0 |
| Tert.-dodecyl mercaptan | 6.0 |
| Tert.-tetradecyl mercaptan | 2.0 |
| Tert.-hexadecyl mercaptan | 2.0 |

The reaction mixture was agitated for 16 hours at 5° C. At the end of this time the agitation was stopped and the excess butadiene was vented from the latex. Analysis showed that the latex contained 11.6 weight per cent polymer. A sample of the latex was coagulated, and the recovered polymer was a clear, free-flowing liquid having a Saybolt furol viscosity of about 1200 seconds at 100° F. and a molecular weight below about 3000.

An emulsion polymerization was effected to produce a terpolymer from the monomers 1-butene, sulfur dioxide and liquid polybutadiene. The liquid polybutadiene was introduced in latex form by employing a portion of the liquid polybutadiene latex prepared as described in the first part of the example. The recipe is given below.

| | Parts by weight |
|---|---|
| 1-butene | 15.0 |
| Sulfur dioxide | 30.3 |
| Liquid polybutadiene latex | [1] 6.5 |
| Water | 57.8 |
| Lithium nitrate | 0.17 |
| Sodium alkaryl sulfonate | 1.71 |

[1] This amount of latex represents 0.75 parts of liquid polybutadiene.

The reaction mixture was agitated for 21.5 hours at 25° C. At the end of this time the agitation was stopped and the excess sulfur dioxide was vented from the latex, which was coagulated with methanol, washed several times each with water, n-heptane, and methanol, and dried overnight in an air oven at 150° F. Analysis showed that the product contained 26.26 per cent sulfur by weight.

The dried resin molded at a temperature of 255° F. to a hard, clear solid. It was insoluble in acetone, cyclohexanone, and cyclohexylamine. It was heated to 400° F. for 15 minutes with no decomposition occurring. It was compatible with a plasticizer, ethyl phthalyl ethyl glycollate and was plasticized by it to a more or less elastic solid.

A sample of a copolymer of sulfur dioxide and liquid polybutadiene was prepared by emulsion polymerization to compare the properties of a mixture of such a copolymer and a 1-butene-sulfur dioxide resin with the properties of the liquid polybutadiene-1-butene-sulfur dioxide terpolymer. The copolymer of liquid polybutadiene and sulfur dioxide was prepared in the following manner:

To 50 parts of the polybutadiene latex prepared as described in the first part of the example were added 20 parts of sulfur dioxide and 1.5 parts of a 10 weight per cent aqueous solution of lithium nitrate catalyst. This reaction mixture was agitated for 42 hours at 25° C. At the end of this period the agitation was stopped and the excess sulfur dioxide was vented from the latex. The latex was coagulated with methanol and filtered. The polymer was washed several times with methanol and with water, then dried in vacuo. It was a hard, white solid which on analysis was found to contain 21.54 weight per cent sulfur. This product was insoluble in hydrocarbons, water, acetone, and cyclohexanone. Isoamyl acetate or sulfolane had no solvent effect on it. It was stable at much higher temperatures than olefin-sulfur dioxide resins and would not melt or mold, but decomposed at very high temperatures without any apparent melting.

A small amount of this copolymer was powdered and mixed with a large amount of 1-butene-sulfur dioxide resin prepared by emulsion polymerization, and this mixture was compression molded at 300° F. The molded article was clouded by the unchanged particles of polybutadiene polysulfone dispersed throughout it. Another sample of the 1-butene-sulfur dioxide resin was molded without the polybutadiene polysulfone. It was clear and transparent. It was soluble in acetone and cyclohexanone. When a sample of this resin was heated for 15 minutes at 400° F. it lost more than 10 per cent of its weight by decomposition.

*Example II*

Liquid polybutadiene was prepared by polymerizing 1,3-butadiene dissolved in normal heptane at a temperature of about 90° C. in the presence of finely divided sodium metal as catalyst. The viscosity of the liquid polybutadiene was 515 Saybolt furol seconds measured at 100° F. The molecular weight was about 2000.

Portions of this liquid polybutadiene were copolymerized with 2-butene and sulfur dioxide using the following emulsion polymerization recipes:

|  | Run Nos. 1 and 2 | Run Nos. 3 and 4 |
|---|---|---|
|  | Parts by Weight | Parts by Weight |
| 2-Butene | 44.4 | 39.7 |
| Liquid polybutadiene | 2.3 | 7.0 |
| Sulfur dioxide | 88.3 | 88.3 |
| Lithium nitrate | 0.5 | 0.5 |
| Sodium lorol sulfate | 2.0 | 2.0 |
| Water | 180.0 | 180.0 |

The reaction mixture in each case was agitated for 9 hours at 25° C.

Unreacted monomers were removed from the polymeric product, the product dried and the percent yield determined in each case, as shown in the table following:

| Run No. | Yield,[1] Percent |
|---|---|
| 1 | 59.5 |
| 2 | 59.2 |
| 3 | 53.1 |
| 4 | 55.7 |

[1] Yields were based on olefinic materials charged, assuming that sulfur dioxide reacts in a 1:1 mol ratio with each butadiene unit in polybutadiene.

A pellet was molded from polymer made in Run No. 1 at 340° F. None of the resins were soluble in acetone.

*Example III*

Another series of polymerizations were effected as in Example II except that the 2-butene was replaced by 1-octene. The yields are shown in the table below.

| Run No. | Polybutadiene, Percent of Olefinic Material Charged | Yield, Percent |
|---|---|---|
| 5 | 5 | 70.0 |
| 6 | 5 | 75.2 |
| 7 | 15 | 49.6 |
| 8 | 15 | 54.7 |

As will be evident to those skilled in the art, various modifications of this invention can be made, or followed, in the light of the foregoing disclosure and discussion, without departing from the spirit or scope of the disclosure or from the scope of the claims.

I claim:

1. A process for the preparation of a heteropolymeric resinous material by inter-reacting a monoolefinic organic compound having not more than 20 carbon atoms in the molecule with sulfur dioxide and a liquid polymer of 1,3-butadiene having a molecular weight above 500 and a viscosity at 100° F. below 10,000 Saybolt furol seconds, said process comprising admixing said monoolefinic compound with a molecular excess of sulfur dioxide and with said liquid polymer in an amount of from 0.3 to 15 per cent based on the weight of said monoolefinic compound and maintaining the resulting admixture at a temperature within the limits of 10 and 140° F. in the presence of a catalyst capable of inducing the reaction of sulfur dioxide with an olefin in the absence of light, and recovering a heteropolymeric resinous material as a product of the process.

2. A process for the preparations of a heteropolymeric resinous material, comprising admixing a monoolefin hydrocarbon having not more than 20 carbon atoms in the molecule, with a molecular excess of sulfur dioxide, and a polymer of 1,3-butadiene in an amount of from 0.3 to 15 per cent based on the weight of said monoolefin and having a molecular weight above 500, and a viscosity at 100° F. below 10,000 Saybolt furol seconds, in the presence of water in an amount not greater than 1000 parts by weight per 100 parts by weight of said monoolefin and sufficient to produce a final liquid emulsion, also admixing therewith a catalyst which is capable of inducing the reaction of sulfur dioxide with an olefin at an appreciable rate in the absence of light, in an amount between 0.03 and 0.6 part per weight per 100 parts by weight of total reactants, and maintaining said mixture emulsified at a reaction temperature between 10 and 140° F. for a time sufficient to react at least 50 per cent of said monoolefin.

3. A process for preparing a latex comprising a finely divided resinous material present as a dispersion in an aqueous medium, which comprises emulsifying a monoolefinic organic compound and from 0.3 to 15 per cent of a polybutadiene based on the weight of said monoolefinic compound and having a molecular weight above 500, and a viscosity at 100° F. below 10,000 Saybolt furol seconds, in an aqueous medium, in an emulsion of the oil-in-water type, and in the presence of sulfur dioxide in an amount stoichiometrically in excess of said monoolefinic organic compound, effecting an inter-reaction of said sulfur dioxide, said polybutadiene, and said monoolefinic organic compound to produce a heteropolymeric reaction product, and recovering a resulting latex.

4. A process for the manufacture of a heteropolymeric resinous material, comprising intermixing an aliphatic monoolefin having not more than 20 carbon atoms in the molecule with sulfur dioxide, a liquid polymer of 1,3-butadiene having a molecular weight above 500, and a viscosity at 100° F. below 10,000 Saybolt furol seconds, and water, in proportions to produce a resulting reaction mixture containing said sulfur dioxide in a mol ratio to said monoolefin greater than 1:1 and not exceeding 5:1, from 0.3 to 15 per cent of said polymer based on the weight of said monoolefin, and from 150 to 1000 parts by weight of water per 100 parts by weight of said monoolefin and sufficient to produce a final liquid latex, including in said admixture an emulsifying agent which is effective in an acid medium and a catalyst capable of inducing the reaction of sulfur dioxide with an olefin in the absence of light, maintaining said mixture emulsified at a reaction temperature within the limits of 10 to 140° F. for a time sufficient to react at least 50 per cent of said olefinic compound, and recovering a resulting heteropolymeric product so produced.

5. An improved process for producing a heteropolymeric resinous material by inter-reacting sulfur dioxide, an aliphatic monoolefin containing not more than 20 carbon atoms in the molecule, and a liquid polybutadiene having a molecular weight above 500, and a viscosity at 100° F. below 10,000 Saybolt furol seconds, said process comprising introducing said monoolefin together with a molecular excess of sulfur dioxide and from 0.3 to 15 per cent of said liquid polybutadiene based on the weight of said monoolefin into an aqueous emulsion comprising between 150 and 1000 parts of water by weight per 100 parts by weight of said monoolefin, and containing lithium nitrate as a catalyst in an amount between 0.03 and 0.6 part by weight per 100 parts by weight of total reactants and between 1 and 10 parts by weight per 100 parts by weight of total reactants of an emulsifying agent active in an aqueous medium having a pH below 7, maintaining the resulting emulsion at a temperature within the limits of 10 and 140° F., and recovering a heteropolymeric resinous material as a product of the process.

6. A process for the manufacture of a heteropolymeric resinous material, comprising intermixing 1-butene with sulfur dioxide and a liquid polymer of 1,3-butadiene having a molecular weight above 500, and a viscosity at 100° F. below 10,000 Saybolt furol seconds, and water, in proportions to produce a resulting reaction mixture containing sulfur dioxide in a mol ratio to said 1-butene greater than 1:1 and not exceeding 5:1, from 0.3 to 15 per cent of said polymer based on the weight of said 1-butene, and from 150 to 1000 parts by weight of water per 100 parts by weight of said 1-butene and sufficient to produce a liquid latex, including in said admixture an emulsifying agent comprising a sodium alkaryl sulfonate containing from 11 to 15 carbon atoms in the alkyl radical and a single aryl ring, and together with lithium nitrate as a catalyst, maintaining said mixture emulsified at a temperature within the limits of 10 to 140° F. for a time sufficient to react at least 50 per cent of said 1-butene, and recovering a resulting heteropolymeric material so produced.

7. The process of claim 4 wherein said aliphatic monoolefin is 2-butene, wherein said catalyst is lithium nitrate and wherein said emulsifying agent is sodium lauryl sulfate.

8. The process of claim 4 wherein said aliphatic monoolefin is 1-octane, wherein said catalyst is lithium nitrate, and wherein said emulsifying agent is sodium lauryl sulfate.

9. A new composition of matter comprising a terpolymer of sulfur dioxide, a monoolefinic organic compound containing not more than 20 carbon atoms in the molecule, and a liquid polymer comprising a polymer of 1,3-butadiene and having a molecular weight above 500, and a viscosity at 100° F. below 10,000 Saybolt furol seconds, said composition having been prepared by inter-reacting the above said sulfur dioxide, monoolefinic compound and polymer at a temperature within the limits of 10 to 140° F. when the reaction mixture contains sulfur dioxide in molecular excess of said monoolefin and from 0.3 to 15 per cent of said polymer based on the weight of monoolefin therein, and lithium nitrate as a catalyst.

10. A latex comprising a finely divided resinous material present as a stable dispersion in an aqueous medium, prepared by emulsifying a monoolefinic organic compound and from 0.3 to 15 per cent of a polybutadiene based on the weight above said monoolefinic compound and having a molecular weight of 500, and a viscosity at 100° F. below 10,000 Saybolt furol seconds in an aqueous medium, in an emulsion of the oil-in-water type, and in the presence of sulfur dioxide in an amount stoichiometrically in excess of said monoolefin organic compound, and inter-reacting said sulfur dioxide, said polybutadiene and said monoolefin organic compound while in said aqueous medium.

11. A process for the preparation of a heteropolymeric resinous material, comprising admixing a monoolefinic organic compound with a molecular excess of sulfur dioxide and with from 0.3 to 15 per cent of a liquid polymer of a diolefin hydrocarbon containing from 4 to 6 carbon atoms in the molecule and having a molecular weight above 500, and a viscosity at 100° F. below 10,000 Saybolt furol seconds, based on the weight of said monoolefinic compound, and maintaining the resulting admixture at a temperature within the limits of 10 and 140° F. in the presence of a catalyst capable of inducing the reaction of sulfur dioxide with an olefin in the absence of light, and recovering a heteropolymeric resinous material as a product of the process.

12. A process for the preparation of a heteropolymeric resinous material comprising admixing a monoolefinic organic compound with a molecular excess of sulfur dioxide and with from 0.3 to 15 per cent of its weight of a liquid polymer of a conjugated diolefin hydrocarbon containing from 4 to 6 carbon atoms in the molecule, having a molecular weight above 500, and a viscosity at 100° F. below 10,000 Saybolt furol seconds and being free from solid polymers, maintaining a resulting admixture at a temperature within the limits of 10 and 140° F. and in the presence of a catalyst capable of inducing the reaction of sulfur dioxide with an olefin in the absence of light, and recovering a heteropolymeric resinous material from the resulting reaction mixture as a product of the process.

CHARLES S. LYNCH.

REFERENCES CITED

The following references are of record in the file of this patent:

UNITED STATES PATENTS

| Number | Name | Date |
|---|---|---|
| 2,146,276 | Wilder | Feb. 7, 1939 |

OTHER REFERENCES

Schmidt & Marlies: "Principles of High-Polymer Theory and Practice (1948), pages 237–239.